US008627209B2

(12) United States Patent
Ganz et al.

(10) Patent No.: US 8,627,209 B2
(45) Date of Patent: Jan. 7, 2014

(54) SOCIAL NETWORKING IN A NON-PERSONALIZED ENVIRONMENT

(75) Inventors: Howard Ganz, North York (CA); Karl Joseph Borst, Toronto (CA); Jesse Scoble, Toronto (CA); Sally Christensen, Richmond Hill (CA)

(73) Assignee: GANZ, Woodbridge, Ontario ( * ) Notice: Subject to any disclaimer, the term of this patent is extended or adjusted under 35 U.S.C. 154(b) by 1301 days.

(21) Appl. No.: 12/136,469

(22) Filed: Jun. 10, 2008

(65) Prior Publication Data

US 2009/0307609 A1 Dec. 10, 2009

(51) Int. Cl.
*G06F 3/00* (2006.01)

(52) U.S. Cl.
USPC ........... 715/751; 715/234; 715/760; 715/762; 715/764

(58) Field of Classification Search
USPC .......................... 715/234, 751, 760, 762, 764
See application file for complete search history.

(56) References Cited

U.S. PATENT DOCUMENTS 5,826,250 A 10/1998 Trefler
5,895,902 A 4/1999 Ziarno
6,009,458 A 12/1999 Hawkins et al.
6,406,370 B1 6/2002 Kumagai
6,476,830 B1 11/2002 Farmer et al.
6,729,884 B1 5/2004 Kelton et al.
6,773,325 B1 8/2004 Mawle et al.
6,910,186 B2 6/2005 Kim
6,948,131 B1 9/2005 Neven et al.
7,037,166 B2 5/2006 Shrock et al.
7,081,033 B1 7/2006 Mawle et al.
7,136,826 B2 11/2006 Alsafadi et al.
7,171,154 B2 1/2007 Fujisawa
7,266,522 B2 9/2007 Dutta et al.
7,288,028 B2 10/2007 Rodriquez et al.
7,297,063 B2 11/2007 Fujisawa et al.
7,342,587 B2 3/2008 Danzig et al.
8,171,128 B2 5/2012 Zuckerberg et al.
2001/0020955 A1 9/2001 Nakagawa et al.
2002/0113809 A1 8/2002 Akazawa et al.
2002/0119810 A1 8/2002 Takatsuka et al.
2002/0130894 A1 9/2002 Young et al.
2003/0093293 A1 5/2003 Han
2003/0220885 A1 11/2003 Lucarelli et al.
(Continued)

FOREIGN PATENT DOCUMENTS

CA 2552008 A1 1/2008
GB 2365364 2/2002
(Continued)

OTHER PUBLICATIONS

"Barbie Girls Tips for Parents", Mattel, Inc., http://www.barbiegirls.com/legal/parents_text.html, downloaded on May 23, 2007.

(Continued)

*Primary Examiner* — William Bashore
*Assistant Examiner* — David Choi
(74) *Attorney, Agent, or Firm* — Pearne & Gordon LLP

(57) ABSTRACT

A social networking website allowing users to interact socially without revealing any personal information about themselves. The only information they reveal is about their virtual pets in the virtual website world. Different templates for the personalizable portion of the website can be selected, some of which are restricted.

22 Claims, 15 Drawing Sheets

(56) References Cited

U.S. PATENT DOCUMENTS

| | | | | |
|---|---|---|---|---|
| 2004/0043806 | A1 | 3/2004 | Kirby et al. | |
| 2004/0093266 | A1 | 5/2004 | Dohring | |
| 2004/0242326 | A1 | 12/2004 | Fujisawa et al. | |
| 2005/0051617 | A1 | 3/2005 | Gorelick | |
| 2005/0059483 | A1 | 3/2005 | Borge | |
| 2005/0137015 | A1 | 6/2005 | Rogers et al. | |
| 2005/0177428 | A1 | 8/2005 | Ganz | |
| 2005/0250415 | A1 | 11/2005 | Barthold | |
| 2005/0250416 | A1 | 11/2005 | Barthold | |
| 2006/0031147 | A1 | 2/2006 | Bell et al. | |
| 2006/0035692 | A1 | 2/2006 | Kirby et al. | |
| 2006/0123127 | A1 | 6/2006 | Littlefield | |
| 2006/0166593 | A1 | 7/2006 | Shrock et al. | |
| 2006/0173911 | A1* | 8/2006 | Levin et al. | 707/104.1 |
| 2007/0082738 | A1 | 4/2007 | Fickie et al. | |
| 2007/0121843 | A1 | 5/2007 | Atazky et al. | |
| 2007/0136255 | A1 | 6/2007 | Rizzo et al. | |
| 2007/0174304 | A1 | 7/2007 | Shrufi et al. | |
| 2008/0040428 | A1 | 2/2008 | Wei et al. | |
| 2008/0195699 | A1* | 8/2008 | Min et al. | 709/203 |
| 2008/0250332 | A1* | 10/2008 | Farrell et al. | 715/753 |
| 2009/0017915 | A1* | 1/2009 | Baik et al. | 463/42 |
| 2009/0065570 | A1* | 3/2009 | Peters et al. | 235/378 |
| 2009/0167767 | A1 | 7/2009 | Shoval | |
| 2010/0153095 | A1 | 6/2010 | Yang et al. | |

FOREIGN PATENT DOCUMENTS

| | | |
|---|---|---|
| JP | 2001321571 | 11/2001 |
| JP | 2002063092 | 2/2002 |
| WO | 02099581 A2 | 12/2002 |

OTHER PUBLICATIONS

"Barbie Revolutionizes the Way Girls Play", Mattel, Inc., http://investor.shareholder.com/common/download/download.cfm?companyid=MAT&fileid=224357&filekey=581edc95-c0d3-45f5-a6dc-cb3c2ab50331&filename=239128.pdf, downloaded on Mar. 29, 2011.

Grace, "Web Site Tycoon's Next Goal: Sixth Grade; Internet Pet Site Tallies 5 Million Visits a Month," Woonsocket Call, Jun. 19, 2002.

Monopets "The Gurgle" plush toy, undated (photographs taken Aug. 2, 2007).

http://web.archive.org.web.20031202190119/www.monopets.com/, Dec. 2, 2003.

Dialog Search: Online games having players donate to a pool, dated Mar. 20, 2012.

* cited by examiner

FIG. 16A 1602 1604 TEMPLATES CREATE NEW SCHEDULE 1600

| TEMPLATE NAME | START DATE/TIME | END DATE/TIME | EDIT | DELETE |
|---|---|---|---|---|
| DYNAMIC CONTENT | JUNE 1, 2008; 00:01 | JUNE 9, 2008; 23:59 | EDIT | DELETE |
| SAT CONTENT | JUNE 1, 2008; 00:01 | JUNE 9, 2008; 23:59 | EDIT | DELETE |

1606 1609 1608

FIG. 16B

THEMES CREATE NEW SCHEDULE 1610

| THEME NAMES | START DATE/TIME | END DATE/TIME | EDIT | DELETE |
|---|---|---|---|---|
| WINTER FUN | DEC 1, 2007; 00:01 | MAR 9, 2008; 23:59 | EDIT | DELETE |
| VALENTINE'S DAY | FEB 10, 2008; 00:01 | FEB 20, 2008; 23:59 | EDIT | DELETE |

SOCIAL NETWORKING IN A NON-PERSONALIZED ENVIRONMENT

This application is related to, and has similar content to the copending application entitled SOCIAL NETWORKING IN A NON PERSONALIZED ENVIRONMENT, Ser. No. 12/053,260, Filed Mar. 21, 2008, the contents of which are herewith incorporated by reference.

BACKGROUND

Our co-pending application Ser. No. 11/027,647, filed Dec. 30, 2004, and incorporated in its entirety herein by reference, discusses a system of interacting with a virtual representation of a real world product. According to this system, a user can buy a toy such as 100 which is associated with a special code. The toy 100 exists in the real world, and the code forms a key to the virtual world 110. The user enters the code 105 on a website and enters the virtual world 110.

The virtual world 110 provides activities and views with which the user can interact. The virtual world, as part of the interaction, provides a virtual replica 115 of the actual toy 100. Users can carry out various activities on the website using their virtual version of the toy. For example, the user can form a house with rooms, furniture, things, clothing, and other things. The user can also carry out activities to earn cash, and purchase virtual items using that cash.

SUMMARY

The present application describes aspects of social networking on a website.

One aspect of the social networking allows displaying social network items which are not indicative of the users themselves, but rather are indicative of the users' possessions, such as their virtual pets and or other items possessed by the users. An aspect allows personalizing those items to provide even better diversity in the items that can be displayed. This allows the users to carry out social networking in an environment which is much safer than other environments in which the social networking users describe information about themselves.

Another aspect defines tools for forming the personal pages.

BRIEF DESCRIPTION OF THE DRAWINGS

FIGS. 16A and 16B show schedulers;

DETAILED DESCRIPTION

Figure 1:
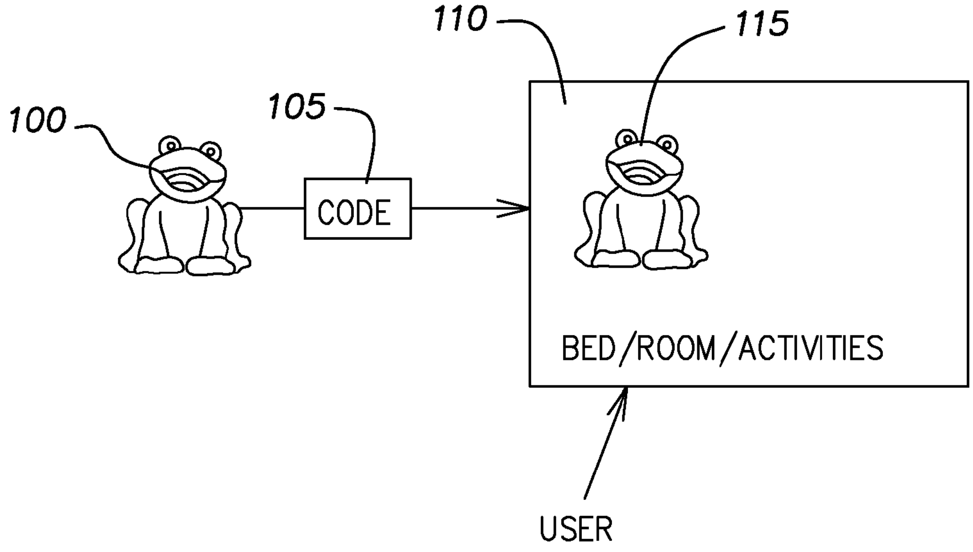
FIG. 1 shows a basic system of interacting with both a real world and virtual world items.

The present application describes additional aspects, actions and activities and additional structure, for adding to a website of the type described in our co-pending application, and as shown generally in FIG. 1. More specifically, the present application involves a system and method that facilitate an online social networking environment in which users interact such as, for example, by creating pages and content for the pages that relate to their respective characters rather than to personal information about the users.

Unlike conventional online social networking environments which focus on each user's personal information including personal photographs, age, gender, appearance, opinions, interests, location, and the like, the subject application allows users to socially interact by way of their particular characters. This is accomplished in part by the generation or creation of content entirely based on and around the characters' personas and virtual existences rather than the users. Thus, characters can be developed to learn and improve skills and traits and, in general, can interact with one another in a social environment without divulging users' personal information. The following figures demonstrate various aspects and embodiments of the application in greater detail.

According to FIG. 1, an item 100 is associated with a code 105. The code 105 can be entered to provide access to a website 110. The website displays a virtual replica 115 that has an appearance that is recognizable as being a similar item to the item 100, responsive to the entry of the code 105. For example, the item 115 may be a cartoonized version of the item 100. The website 110 may allow a user to have a room, furniture in the room, and carry out activities in the room. As shown in FIG. 1, the user interacts with the website to provide these activities. It should be understood, however, that the aspects described herein are not limited to use with the system described in FIG. 1. These aspects can be used with other kinds of websites. For example, any website that allows user interaction can be used with this system. An embodiment describes social networking using the special website illustrated in FIG. 1.

Figure 2:
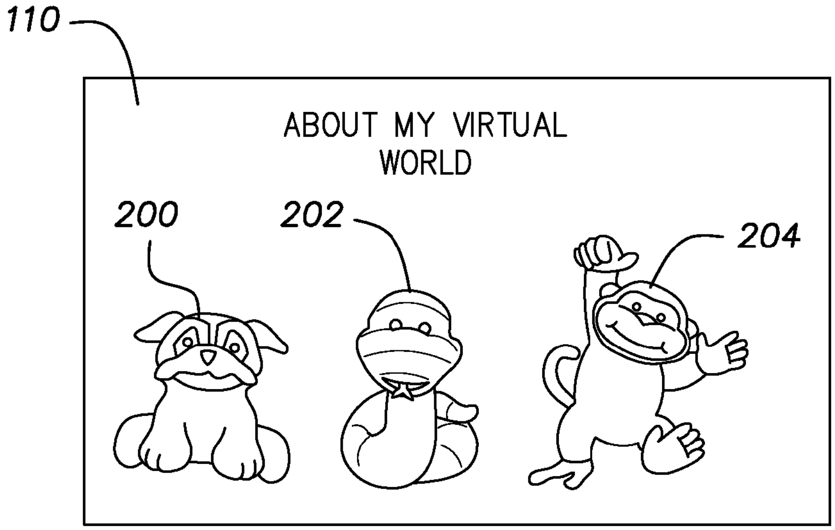
FIG. 2 shows a basic social networking aspect of the virtual world.

FIG. 2 illustrates the basic structure of the embodiment. A website is formed by a number of page creation processes that each create pages based on data and desired characteristics. A virtual representation of a character 200 is shown on the website 110. The character 200 as well as other characters 202, 204, are owned by the social networking user, that is, the person who is hosting the social networking part. Each or only some of the characters may have been personalized. According to this embodiment, the characters can be trained. The training of the characters allows them to obtain and/or improve certain characteristics, such as running, etc. The training can be, however, a less formal training, in which simply interacting with the character(s) in a specified way changes the characteristic of the character.

The characters may also compete based on their characteristics. Those characters which are better trained may have the best performance in their trained characteristics. If the competition was solely about their performance as evidenced by the trained characteristics, the character with the best performance would likely win the competition.

Another aspect, however, is the aspect of creating a hybrid event.

The training may allow the user to train many different characteristics—agility, track and field, intelligence, fashion, strength, and weight lifting, as well as others. Because of the different kinds of training that can be carried out, some of the characters may be better at some trained items than others. While one character may be better at strength, another character may be better at fashion. One character may be better at swimming, and another may be better at baseball.

According to another embodiment, only a certain amount of training per day per activity is allowed, to encourage the users to return to the training site on a regular basis, e.g., every day. In this embodiment, therefore, better trained characters are better competitors. Training is limited to amounts per day, so owners who return to the site more often have better-trained characters that are likely to be more prepared for competition or better or stronger when competing.

Certain kinds of training can unlock new characteristics. For example, the character may not be allowed to swim until it has taken 20 hours of swimming lessons.

Figure 3:
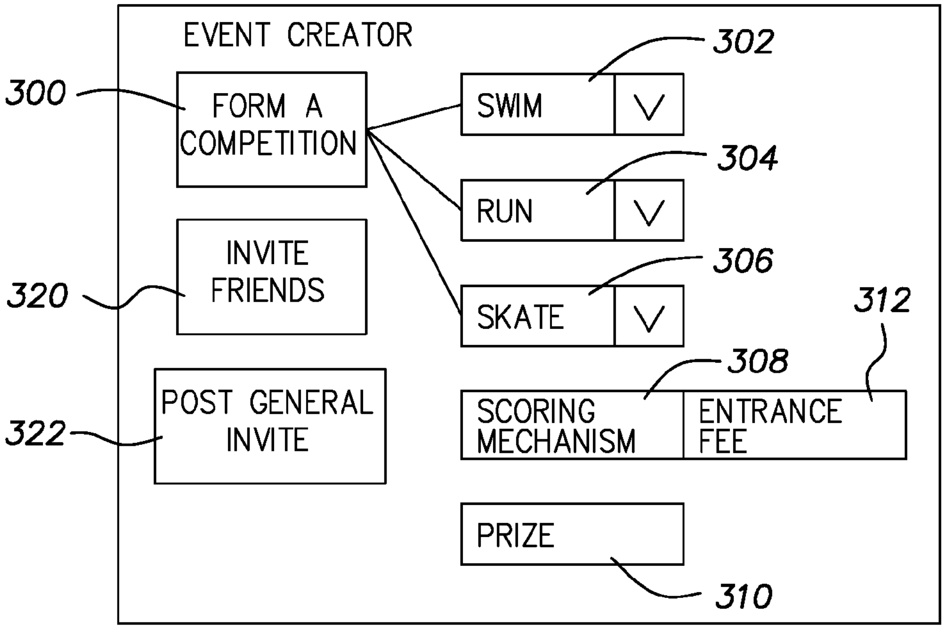
FIG. 3 shows a generic event creator.

An event creator allows forming a competition as shown in FIG. 3. By executing the "form a competition" button, a number of different widgets can be displayed. The competition itself can be, for example, a hybrid triathlon formed by the widgets as shown in FIG. 3. Once having selected "form a competition" at 300, the user can select the different skills in the competition to carry out a desired competitive spirit or example. FIG. 3 shows a "forming the competition" which includes the skills of swim 302, run 304, and skate 306. The competition that is eventually formed will include these three skills.

Other people and their characters can compete in the competition. The competition may also include a "scoring mechanism" button 308, which specifies the kind of scoring that is carried out. A prize can be selected by "prize" button 310. In an embodiment, the website can allow accumulating rewards. Those rewards can be offered as a prize for the competition. For example, the event creator may use some of their virtual cash as a prize item for winning the competition, or just for competing. As an alternative, the user can purchase items, including rare items with their virtual cash, and use those purchased rare items as a prize for winning the competition. If the items are truly hard to find, they may create more of an impetus for the competition.

The user can also charge an entrance fee, for example, as a fee for joining the virtual competition. The entrance fee can be set by the user, who can enter or select a desired value as the entrance fee via a text field, list box, pull-down menu, radio buttons, or any other such data entry object, generally referred to as entrance fee object 312.

A "list box" or other suitable form field tool allowing the user to invite friends 320 can also be provided. In addition, the user can post a general invitation 322, for example in certain kinds of chat rooms, or advertise the invitation process. Different options for the general invitation can be provided.

This event creator widget, however, is just one example of a social widget: widgets that can be used to create customized social events of different types. This is a specialized form of social networking, and one that has never been previously suggested by the prior art.

According to current conventions, social networking is all about "me"—telling the world about things you have done, things you want, etc. However, this version of social networking allows a different form of social networking via events. While FIG. 3 shows the event creator being a social networking vehicle for hybrid events, other style event creation vehicles can also be used.

The social network can also be used to find new people to come to the events, and by so doing, facilitates meeting new friends within the social network. As in the above, any of the social network items can be advertised, prizes can be provided, and people can be invited.

Figure 4:
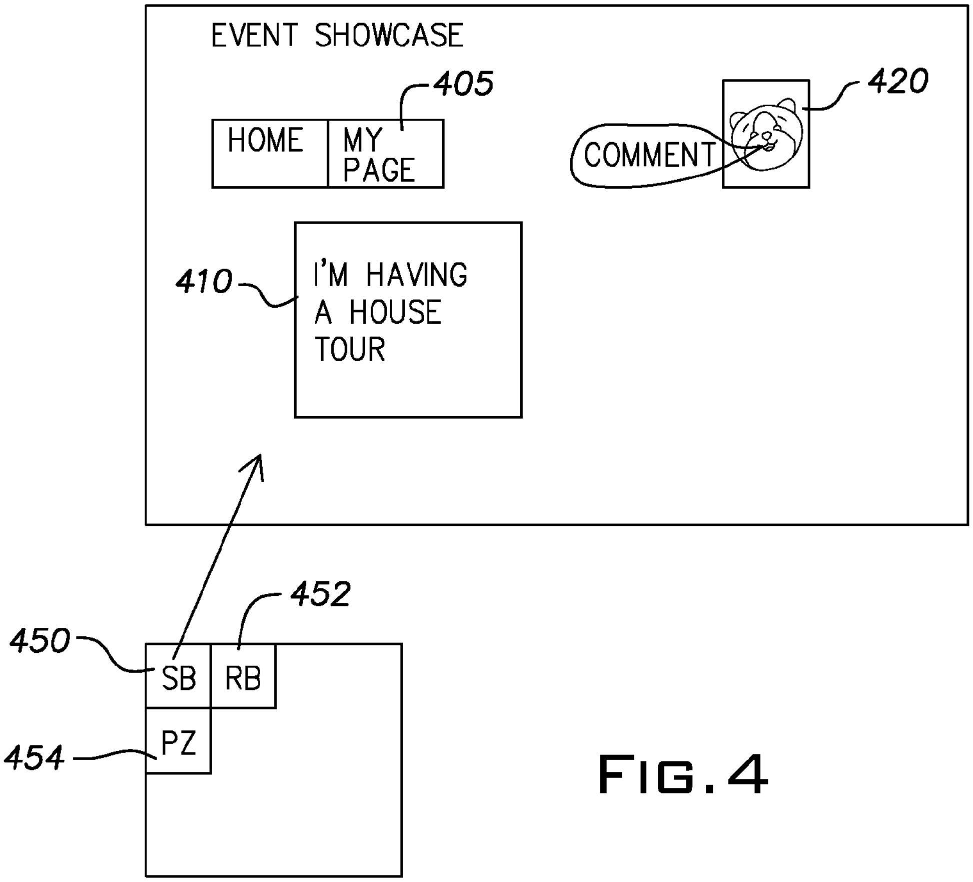
FIG. 4 illustrates an event showcase.

FIG. 4 illustrates an event showcase that can be formed, for example, using one or more of the event creation widgets. The event showcase may be used to provide a special page indicative of the event, as an attempt to get other people to attend the event. In the event showcase of FIG. 4, a house tour is being hosted where the event host is providing a tour of their customized house. Different parts of the tour can be advertised on the event showcase. The event showcase may be separate, for example, from the user's personal page, and can have links 405 to their personal page. It can also have "shout boxes" that allow the user to announce their event or its attributes. Here, the shout box 410 can announce "I'm having a house tour". Other shout boxes can analogously be selected. For example, other boxes might include "I'm showing off my pet", or the like.

In one embodiment, one or a plurality of or all of these shout boxes may be only available with scripted messages to avoid profanities and other undesirable language or content.

A "comment wall" 420 is also provided. In this embodiment, the comment may use a virtual representation of one of the owners' virtual items as the talking head associated with the comment. As with other items in the social networking embodiment, the users can show a picture of their virtual representations instead of a picture of them personally.

In the embodiment, the event showcase can be built by a user, by taking different items such as the shout box 450, and dragging each of those on to the event showcase home page. Each box has a different function, and the user may be allowed to edit some or all of the boxes.

The shout box 450 may allow displaying a number of different messages. The room box 452 may allow setting characteristics of the site. For example, 454 is a prize box that can be edited, and may include options for awarding prizes. The prize may be awarded randomly to, for example, the 17th person who attends, or it may be selected as a sweepstakes, or may be done in some other analogous way. Many different analogous controls can be used.

Figure 5:
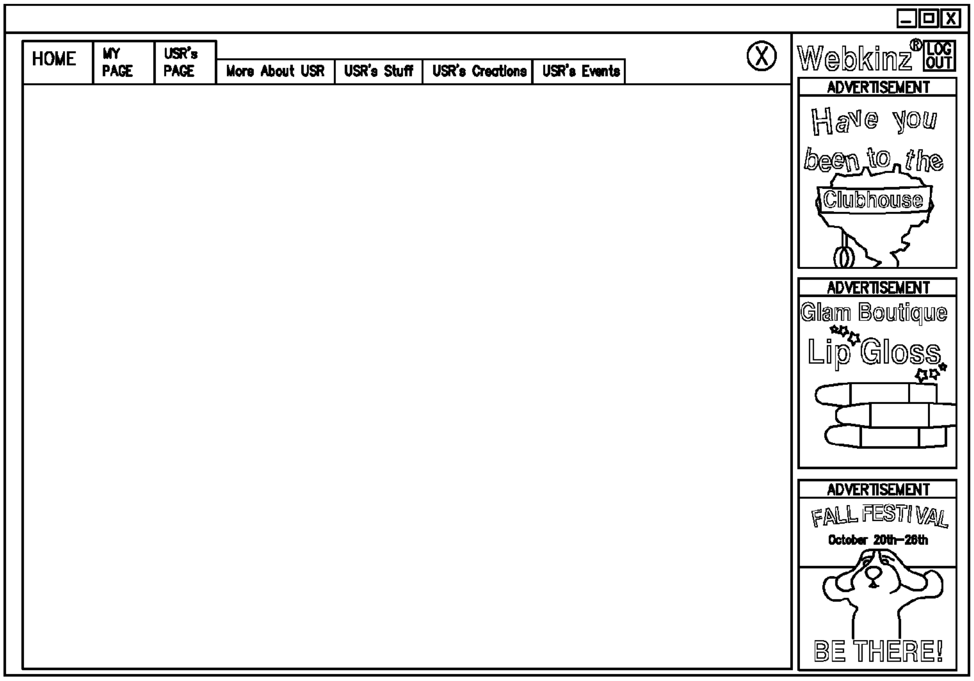
FIG. 5 illustrates the basic blank page of an embodiment.

In an embodiment, the pages may be formed on a grid as shown in FIG. 5. The grid 500 forms the basis of a page in the social networking environment. The grid allows determining the placement of objects on the screen, and automatically snaps the inserted objects to the grids. This feature will ensure that layouts will be neater, while still permitting flexibility in design. Note that the page can also include tabs to navigate easily to other associated pages.

The embodiment uses a grid made up of 10px by 10px squares. All elements applied to the grid conform to the size limitations of the grid; with no half-grid pieces, e.g., no 10px by 5px pieces. The engine may add spacing around objects to ensure that a full 10px by 10px square is used.

While the grid influences placement and alignment of the objects, it still allows control over placement of those objects. On an administrative level, all objects are movable. All pages can be modified through the admin tool. From a user perspective, however, this may not be the case. Objects on the grid will be self-determined; that is, whether an object is movable or editable is a value of the object itself, and something that can be turned on or off by an administrator. So while ultimately all widgets are movable, the ability to move the widget is controlled by the user who makes the page.

A number of tools are also provided for forming the pages.

A Template provides structure for the objects on the page. Templates are used for both system-owned and user-owned pages. Some user-owned pages have the potential to have their templates changed. Templates refer strictly to the layout of the objects on the grid and do not specify any cosmetic features, such as color or font. This may include templates for various 'canned' functions; event pages; triathalon pages, etc.

Themes represent the cosmetic elements of a layout, including font type, font color, background colors, background images, etc. Each object has definable cosmetic features. A theme applies these changes to all of the objects simultaneously. Ultimately, users can be able to create custom themes and adjust cosmetic aspects of the objects themselves on an individual basis, not necessarily within the constraints of a theme.

A widget is a self-contained object that has various adjustable properties. These properties include where the widget exists on the page, its size, cosmetic aspects, and the content to which it is linked. Widgets exist in a display mode and in an edit mode. The widget is accessed in the edit mode, wherein editing of the page by the user is permitted. Edit mode provides customization options for the content of the widget. Cosmetic choices are also available at a later point through a Design toggle associated with the widget.

Editable Layouts provide the user with a medium to design their own layouts for the editable pages. This includes choosing the types of widgets (objects) for the page, their sizes, where they go, and what cosmetic elements are expressed on an individual element basis.

Figure 6:
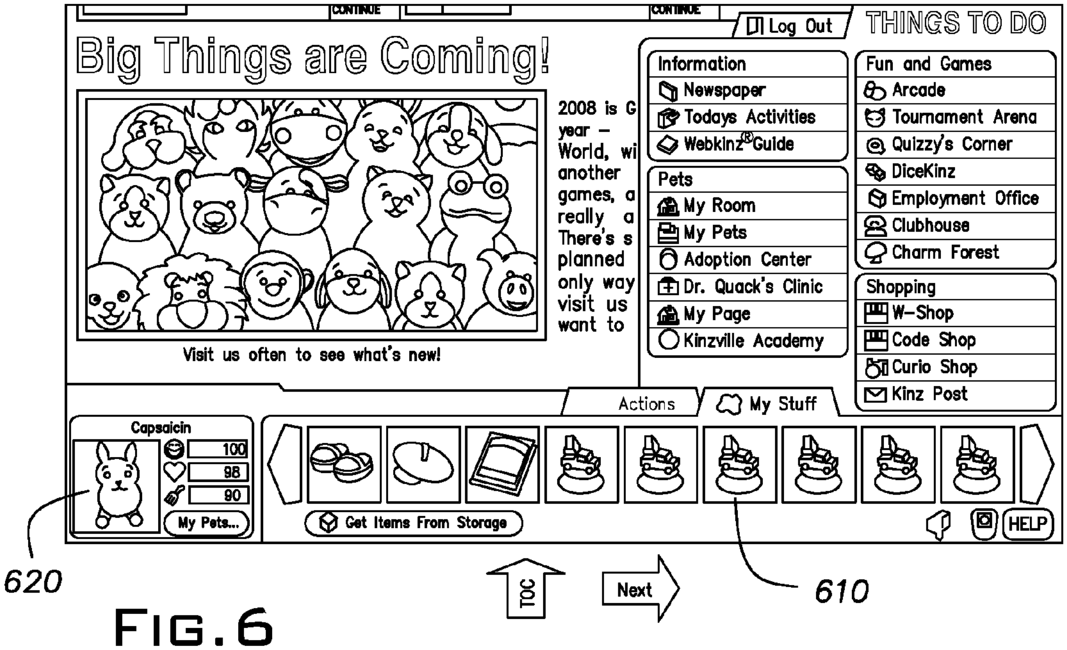
FIG. 6 illustrates how users can access the basic "my page" part of the embodiment.

FIG. 6 shows the start page with the "stuff" bar 610, pets 620, and "things to do" bar 630. The "my page" actuation is part of the things to do menu included on the "my page" actuation shown as 600. Operating the "my page" actuation 600 brings the operator to the "hub" screen shown in FIG. 7.

Figure 7:
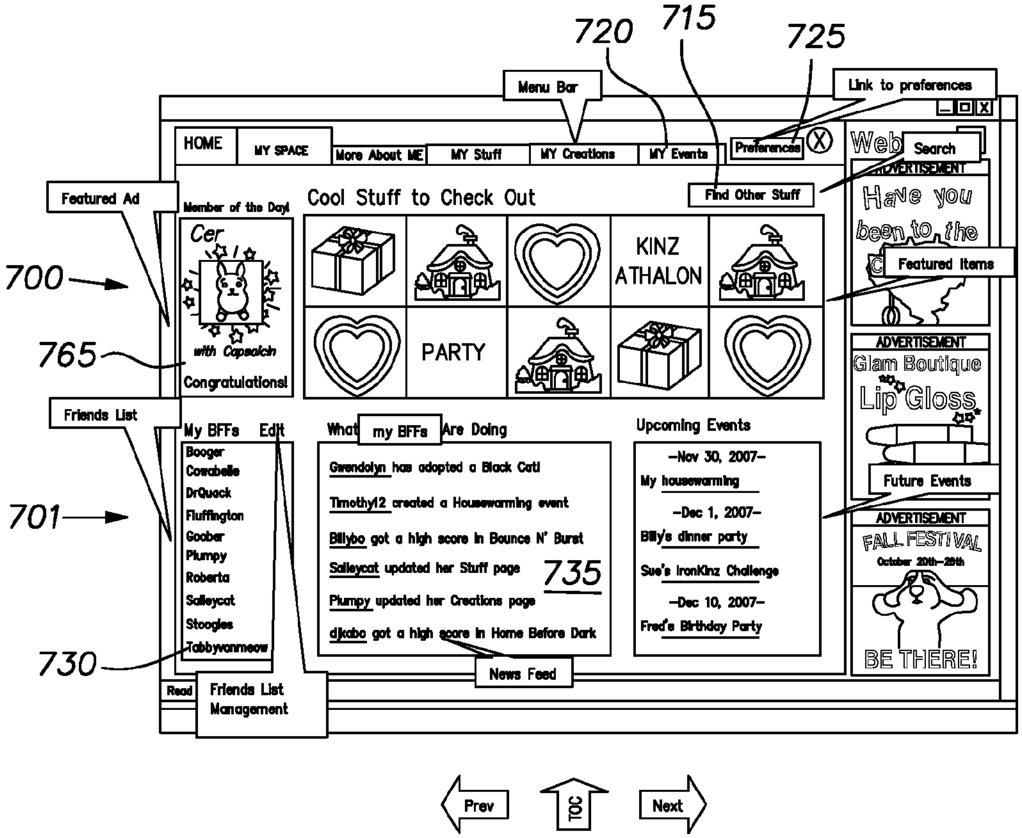
FIG. 7 shows an overview of a "hub" that provides access to the various features.

FIG. 7 shows the hub of the "my page" actuation. This is the central location that introduces the users to the "my page" social networking section. Each user has their own hub, which provides the entry point for all users to their personal page(s).

The hub includes both personal information and system information via a push section 700 which provides the system generated content, and a pull section 701 which is generated based on the content of the users and their selected best friends or, "BFFs".

The push section of the hub includes the featured ad 705, "cool stuff to check out" 710 which may be the featured items from the system, a "search" bar 715 that allows "finding other stuff", a "menu" bar 720, and a link to the "preferences" bar 725. Featured items are placed within the push section, e.g., in the "cool stuff" section 710.

The pull section 701 includes the friends list and its management 731, a newsfeed 735 describing actions that the best friends are doing as part of a feed, and a personalized list of upcoming events 740. As with other things on the social networking site, everything in the pull section is preferably based only on things that happen on the site. The friends are only site based friends, the newsfeed only includes actions that are occurring on the site, and the events are only events that occur on the site. Each of these is only related to an occurrence that happens on the site, thereby providing no personal information about the users.

The newsfeed content 735 is determined by selected actions of the user's best friends. The user can select who are their "best friends" (BFFs), and can also select which activities to track by newsfeed. For example, the selection can include virtual pet adoptions, game high scores, content updates, event creation(s) of friends, virtual pet birthdays, and badges and other awards earned. Note again—each of the tracked activities is based on the activities that are occurring on the website, not personal information about the user themselves.

The news items can also link to the specific user's "my page", for example, or the more "about me" page. Each news item preferably expires after a certain time, for example after two weeks.

The menu bar 720 is a dynamic menu bar that updates depending on whether the user is visiting the hub or visiting their own page or visiting another user's page. The dynamic menu bar includes a home button, a "my page" button, a "more about me" button, and a link to "my stuff", "my creations", and "my events".

Figure 8A:
FIGS. 8A and 8B show how a dynamic menu changes characteristics based on what is being accessed.
Figure 8B:

According to an embodiment, the menu bar 720 changes depending on the viewed locations. FIGS. 8A and 8B respectively show the menu bars when on your own page; and when visiting another user's page. When on one's own page, as shown in FIG. 8A, the user gets tabs for "my page" and links for "me". However, when visiting another user's page, this splits into two; to show not only your page, but also the user's page, showing more about the user, the user's "stuff" etc. In essence, the menu bar becomes dynamic, based on whether it is being used on your own page, or being used on another page.

Figure 9:
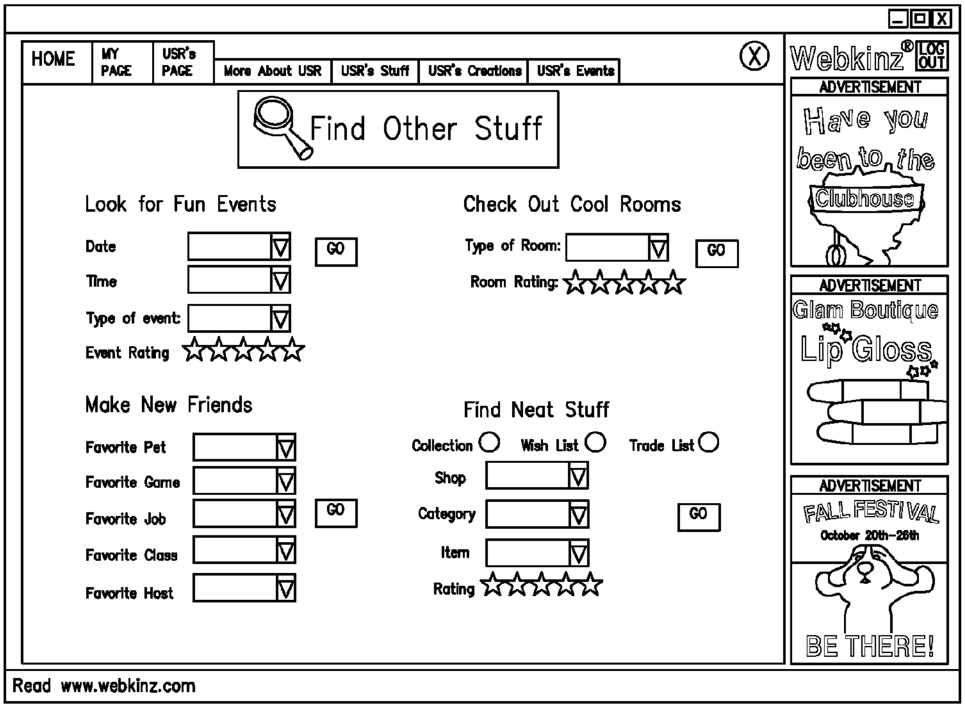
FIG. 9 shows a main search page of an embodiment.

FIG. 9 illustrates how the user can carry out a search to find new friends and items for use on the virtual website. The search can be used for users to find other people to connect with. For example, this may be used for users to find other users who are not already on their friends list.

FIG. 9 illustrates how the users can look for events by date, time, type of event, and/or event rating. The users can look for rooms by type of room and room rating. Users can also use the search engine to try and make new friends, based on their favorite pet, favorite game, favorite job, favorite class, and/or favorite posts. The users can also search for virtual items. The search can be by the specific shop selling the item, by category, by item, and/or by rating.

Figure 10:
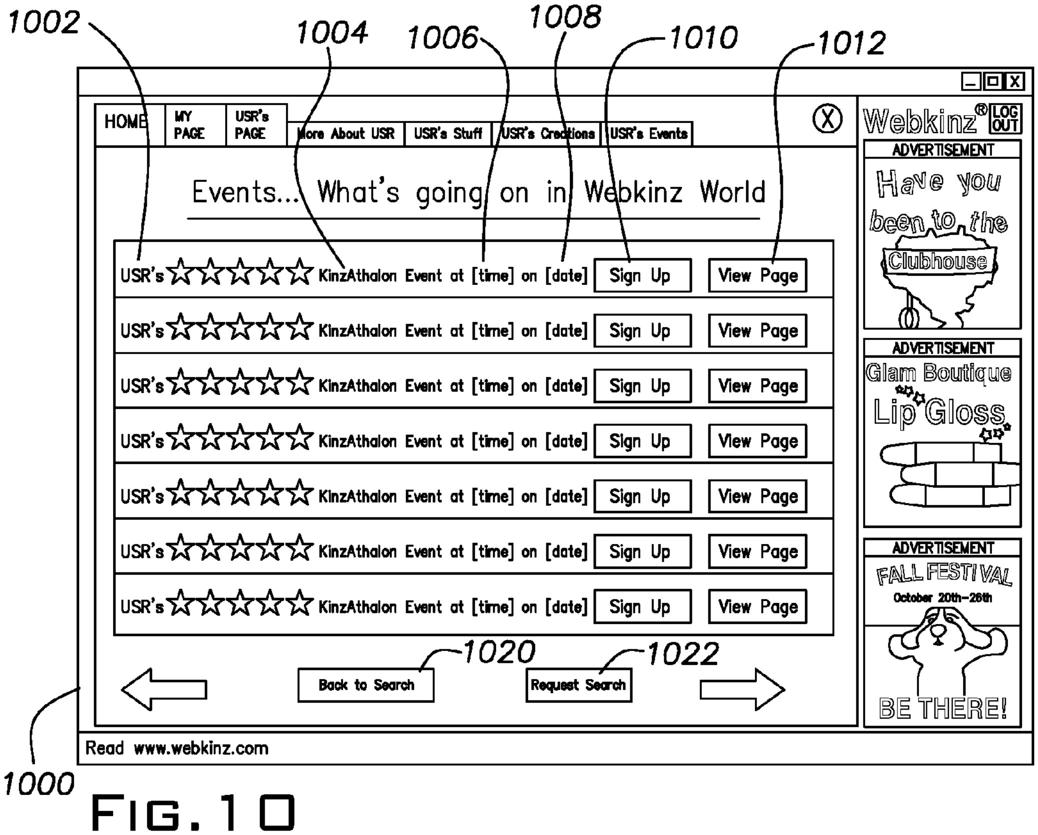
FIGS. 10-12 show result pages from the search page.

Different searches may provide result pages. FIG. 10 illustrates an event result page 1000. The results have a user name 1002, here "USR", a type of event 1004, here an "Kinzathalon" event which may be a selectable triathlon, time 1006, and date 1008. The user is given the chance to sign up for the event via a signup button 1010, or allowed to view the page by a view page button 102. The user can also return to the previous search to modify it, by button 1020, or to do another search by button 1022. The stars shown in FIG. 10 are determined by page viewers, e.g., by friends and visitors who rank the room design when they view it. In an embodiment, rooms inherently have no stars until ranked by at least one person. The search functionality looks for rooms ranked at a certain level. So, for example, if the search tool is set to 5 stars, only 5 star rooms will be returned.

Figure 11:
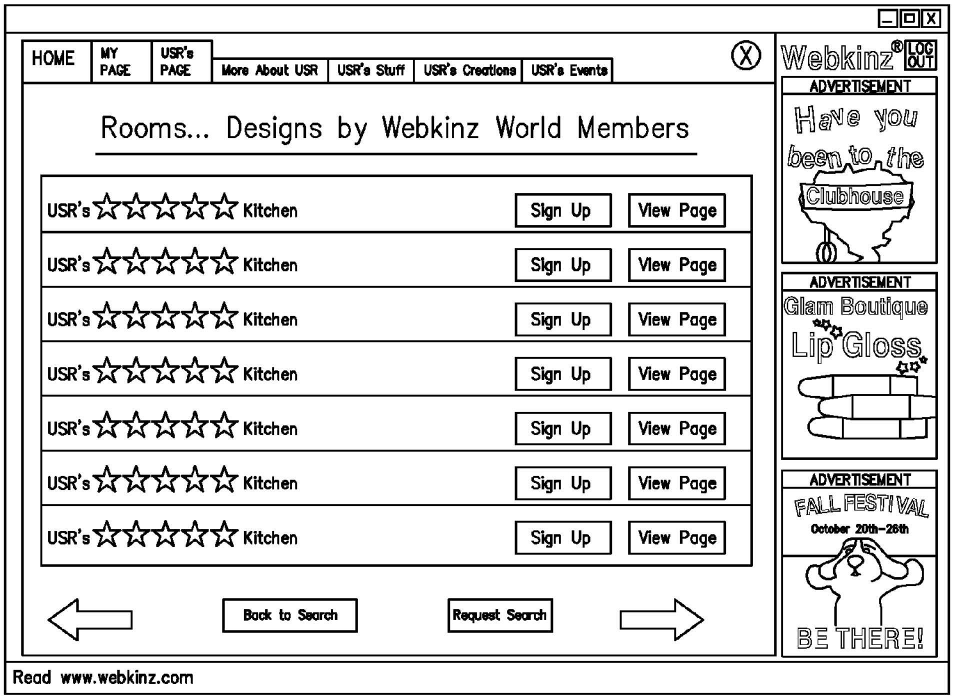

A room result may return the page shown in FIG. 11. This view shows the user, room name, and lets the user view the room and/or view the page. The room rankings as shown are based on ratings from other members.

Figure 12:
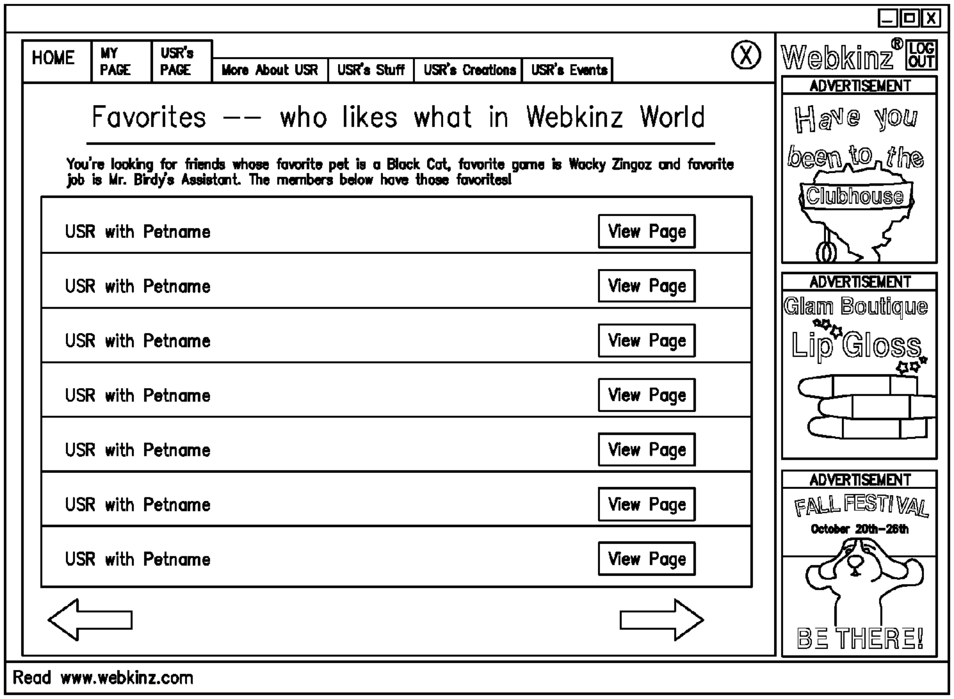

FIG. 12 illustrates a result from the "favorite" search, returning search results of other people who have desired "likes" within the virtual world. The search results return people who have the likes and dislikes, as specified in the search.

The results are shown—here for possible new friends whose favorite pet is a black cat, favorite game is Wacky Zingoz and favorite job is Mr. Birdy's Assistant. This provides a list of users who have that same information.

Figure 13:
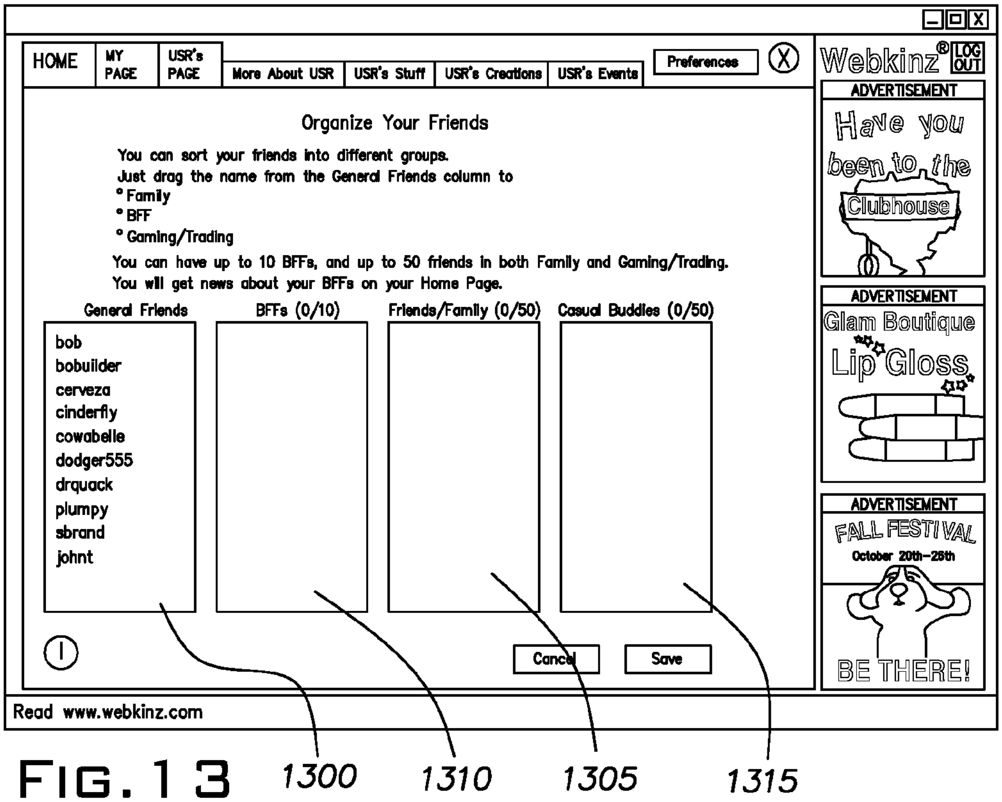
FIG. 13 illustrates a friends list.

FIG. 13 shows organization of the friends list, and in particular shows how this occurs according to social networking.

The general friends are shown at the left, in field 1300. A user can drag any name from the general friends column to different sub columns; including friends/family 1305, best friends (BFFs) 1310, and casual buddies 1315.

In the embodiment, the number of best friends may be limited to some number, e.g., 20 BFFs. The user obtains information about their best friends as part of the newsfeed 735 on their homepage.

The different groups as organized into columns help determine access for various levels on the homepage. In essence, the groups stand organized in series of circles. The friends/family 1305 may be the innermost circle, then your best friends 1310, then your casual buddies 1315, and then random friends. This circle can be used as part of the privacy setting. For example, a user can set their visibility to best friends. This will allow visibility to both family and best friends. If the circle is also set to gaming and trading, then family, best friends and gaming and trading will all be included.

Figure 14:
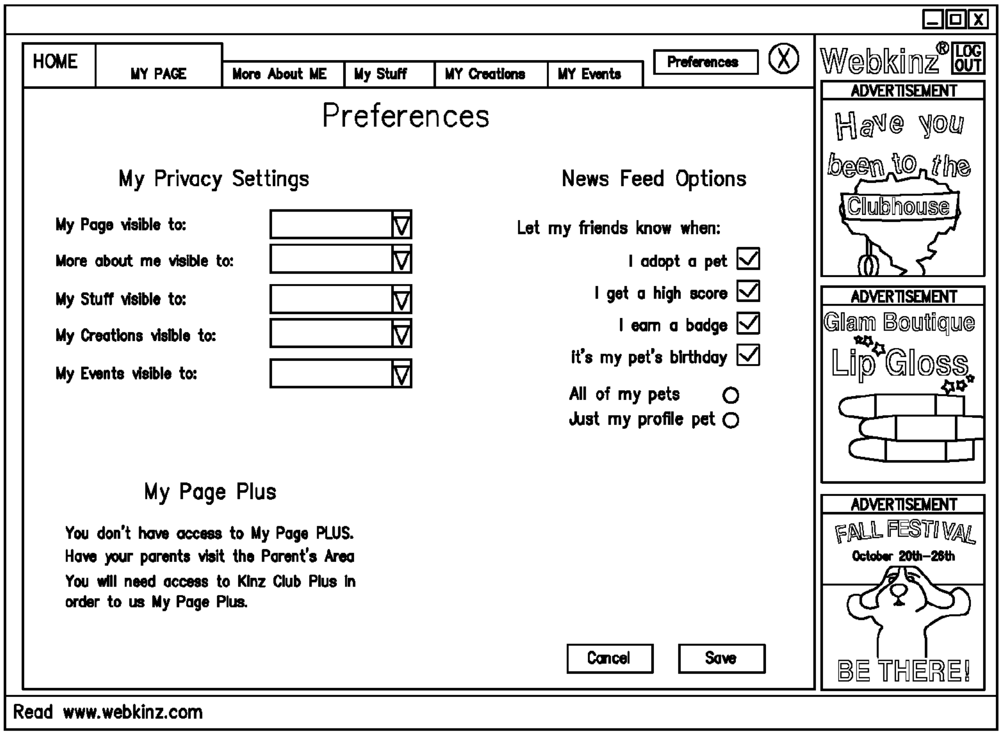
FIG. 14 illustrates how privacy characteristics can be set for this list.

FIG. 14 illustrates the privacy setting capability. In FIG. 14, the user selects to whom their page is visible, to whom the "about me" is visible, as well as who else can view their "my stuff," "my creations," and "my events." The circle organization allows a user to set their page to be invisible to one group of people, but visible to all classes below that one group of people. All of this is available in a drop-down menu. Another aspect shown as 1350 provides information to the friends about when different things occur. For example, this allows you to let your friends know when you adopt a pet, get a high score, earn a badge, or when your pets have a birthday. This may be done for all pets or only for some pets. The "my page plus" may be additional information that may be available only after parents have visited the parents area.

As described above, viewability or access to a user's pages can be limited to

- Family only—only friends labeled as Family can see the page;
- BFFs—only friends labeled as Family and BFF can see the page;
- Trading/Gaming buddies—only friends labeled as Family, BFF and Trading/Gaming buddies can see the page;
- All friends—all friends on the friends list can see the page;
- Everyone—everyone in the entire virtual world can see the page;
- Just Me—no one, other than the owner of the page, can see the page.

Figure 15:
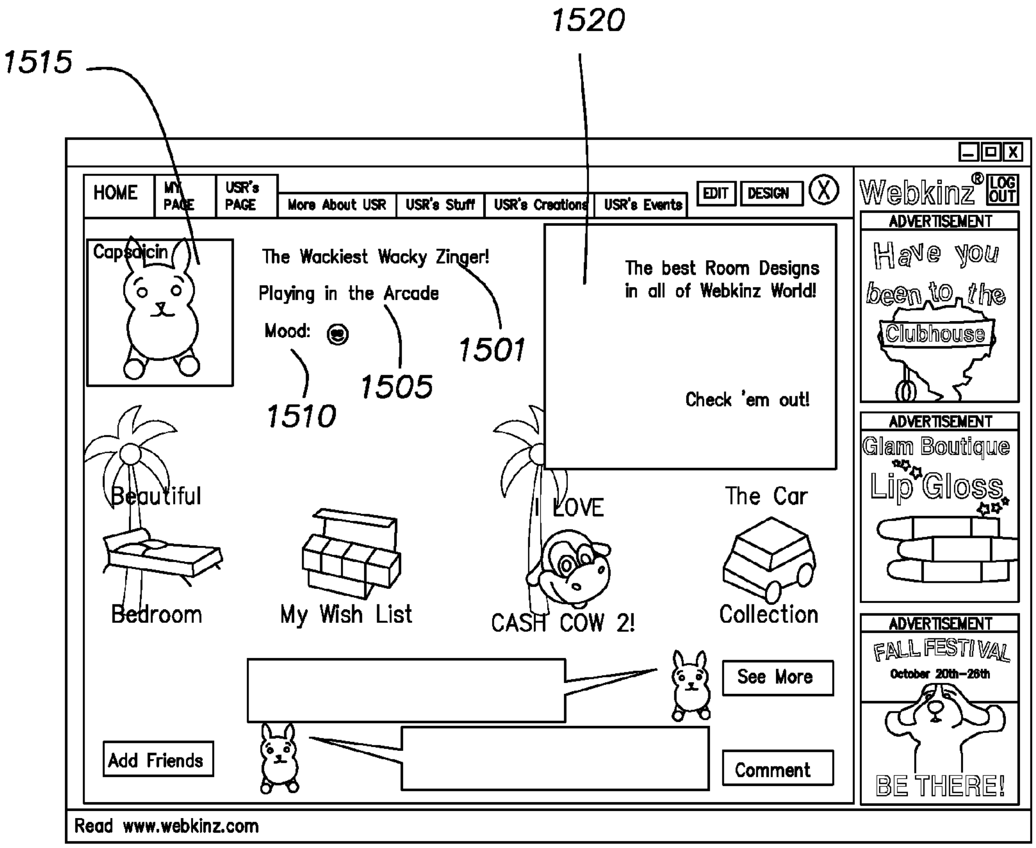
FIG. 15 illustrates how widgets can be used to form a personalized page.

FIG. 15 illustrates the view mode for the "my page" creator. Any of the items including shout boxes, comment boxes, room design boxes, collection boxes wish list, or any other, can all be formed by widgets.

The different widgets can be created within a template, or can be dynamically placed in locations on the page as desired. When in edit mode, any of the different widgets can be selected. A widget can be edited to change its content.

The widget can be removed from edit mode and returned to view mode in which the widget can be viewed.

A tagline 1501 provides a desired phrase on the page. This can be a drop down interface allowing users to select content from a pool of available taglines, e.g., 'canned' lines, random lines and semi-personalized lines that are filled in with site information. Taglines will not divulge personal information of any sort, but rather use content obtained through activity on the site and through pets and feature codes.

The status widget 1505 tells the location and/or status of the user. This may allow selection of that information from a number of different possible pull-down menus. The status widget can tell a status that the user chooses to display, such as "playing in the arcade". The user may also control this to indicate different things about what the user is doing.

A pet widget 1515 allows viewing the pet in a number of different modes, corresponding to different view modes for the pet. The pet's name may be integrated into the tag line.

The room widget 1520 shows the user's room. Pets or other items can also be selected. The user can also select their favorite item on a "favorite" widget. The user can select their mood from a number of different moods on the mood widget 1510. The default mood may be happy, but the user can select other moods. The user can also select a "welcome" widget that displays a welcome message. An item widget may display a featured item or other similar item. An "event" widget can advertise an event. A "shout box" widget allows displaying one of several different messages. An "add a comment" widget allows different people to leave comments about the site or the user. An "add-to-friends" widget allows the user to add people to their friends list. A "badges" widget allows showing the different badges that the user has. The user can also have an "other pets" widgets to show the other pets they have. A "member since" widget can be used to show how long the user has been a member. A "number of pets" widget can show how many pets the user has. The "pets favorites" widget can show the pets favorite food and the "pets birthday" widget can show the birthday. A "high score" widget can show the user's highest score. A "banner" widget may show more about the user via a banner message. Other widgets are also contemplated.

Again, this is unlike other social networking sites in that rather than showing off the user's personal information about themselves personally, this system shows off the virtual room or information and not your own (i.e., the user's) personal room or information. This system allows searching of information about virtual representations who are citizens of Webkinz World, such as the virtual representation's favorite game or favorite job, for example, that would allow identification of, or contact to be established with the user's virtual persona on the site, rather than the user him or her self. Social networking sites like Facebook® require information about yourself. The present system has no real personal information, only virtual information. In this system, unexpectedly, you show your room—again, unlike Facebook®, this is the room that you created during the rest of your site activities and hence this, not your personal information, is what you show to others. Facebook® requires you to enter information about your own activities, but the present system allows you to create the content of the website.

Special days may also be defined; e.g., triathlon day, showing off your room day, or other events or occasions. Unlike providing personal information about yourself, this system is all about the virtual world. The safeguard is inherent because this is all about the site, and all the information comes from the site. This provides users with a greater ability to express themselves and create online identities in a controlled, secure environment. It extends the social networking aspect of the site; letting users browse profiles and discover new friends, though without exposing personally identifiable information. For instance, the invite function provides the ability to allow the virtual representation belonging to the user to meet new virtual representations belonging to other people.

The content on these networks may be, as previously described, a variable depending on a time and date and other parameters. FIGS. 16A and 16B illustrate section schedulers that allow defining templates and layouts for the hub sections described above. These layouts can be defined along with timing for the layouts and content to be associated with the layouts. For example, FIGS. 16A and 16B illustrate how a hub scheduler can operate. A schedule can be created for either a template for use as a theme. FIG. 16A shows the template creator, which can create a template for displaying different kinds of content. In these embodiments, the items created by the schedulers can be created by system administrators, for example. The embodiments describe these templates as having been created by system administrators. However, it should be understood that other users may be able to create templates in an analogous way. In addition, while the specification describes creation of templates, it also contemplates the use of these templates.

The button 1600 can be used to create a new schedule. For example, the new schedule may be shown with a start time for the content 602 and an end time for the content 1604. The template may also be created to have a name shown in 1606, which can represent the subject matter of the template, and can signal what the template will look like to the user of the template.

In a similar way, the theme scheduler shown in FIG. 16B allows creating a new schedule 1610, with a theme name, a start time, and an end time. The scheduler also allows editing the content, e.g., changing the template using edit buttons such as 1608. A schedule and/or template or theme can be removed using the remove button 1609.

An advantage of the intervals is that seasonal changes can be made to the look and feel of the hub or homepage for a set duration. The duration can be set and automatically executed. For example, the duration might be during the Christmas season (December 1-26$^{th}$). These seasonal contents can be automatically changed, for example, as necessary. For example, they can be automatically changed once a month, or the like.

The templates may include a first template category that displays dynamically generated widget content. A second template category displays dynamically generated advertising content.

Figure 17:
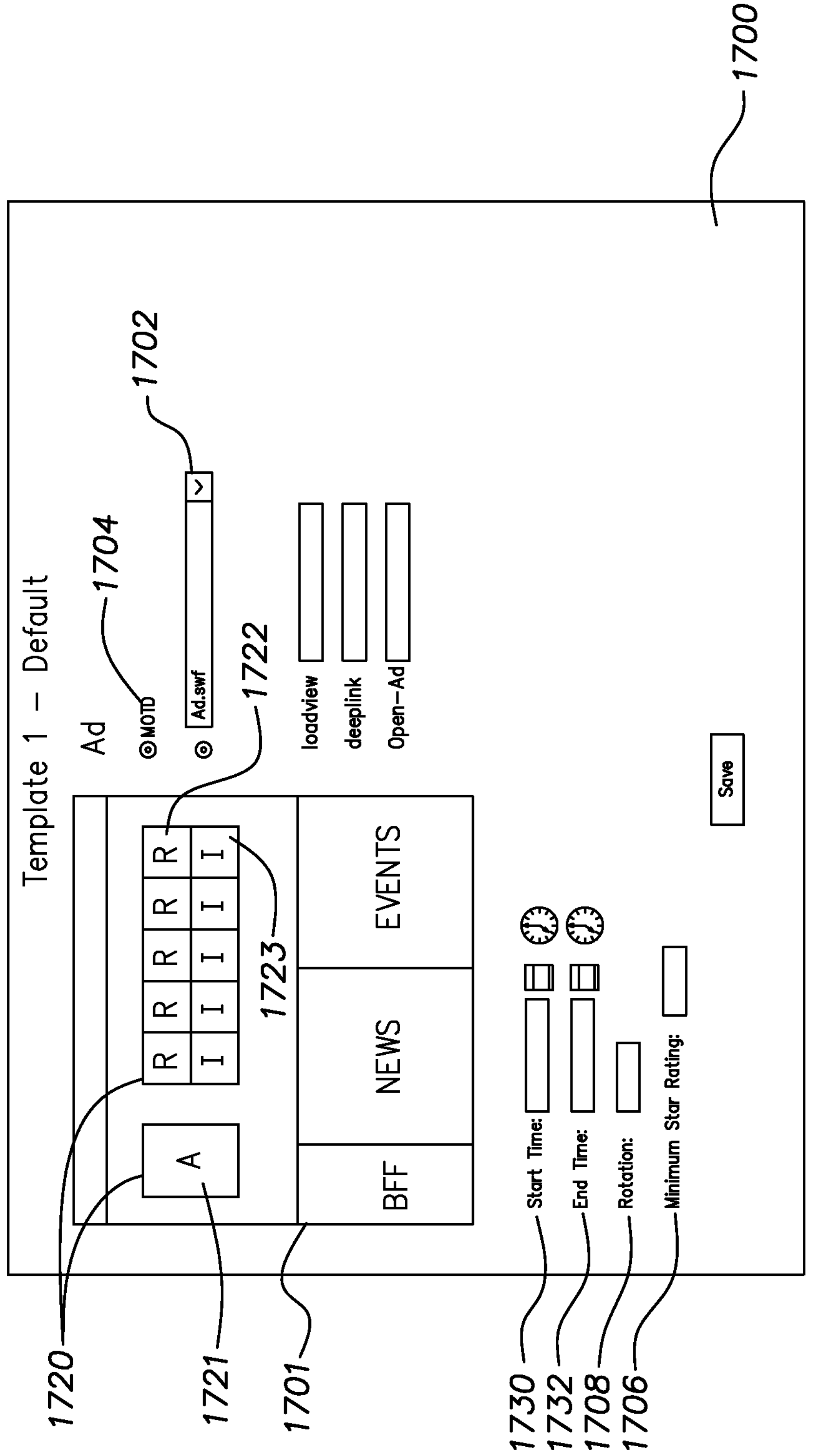
FIG. 17 illustrates a template.

FIG. 17 illustrates a scheduled template which has dynamic widget content. There may be different templates offered, where the template shown in FIG. 17 may be the default template. The default template may be automatically used for the hub portion of the social networking in the absence of a scheduled template.

Dynamic widget content may automatically be drawn and displayed in areas 1750 and others. The dynamic widget content may be drawn from a pool of user widgets. For example, highly rated room and item collections may be featured on the user's front page or hub page. This default template may be selected to be an ad template by button 1702, or a 'member of the day' template by 1704. Different categories can then automatically be displayed.

The template may display rooms belonging to others in section 1722, and items of others in 1725. For example, the user can set the minimum star rating 1706 for rooms and items. The user can set 4 stars as a minimum star rating that will set the minimum rating before dynamic content will be displayed. When the value is set to 4 stars, for example, only four or five star rooms or item collections will be displayed. The rotation interval 1708 sets how often dynamic content is changed. The template itself then displays the different features that are selected therein including the user's best friends, news (dynamic), and events (also dynamic). The system allows changing characteristics of the layout, and a preview part 1700 shown in FIG. 17 actually shows the basic preview of the template layout 1701 on the left part of the screen as it is being laid out.

Other templates can produce other kinds of pages.

The locations of the ad 1721, rooms 1722, and item collections 1723 can all be rearranged. In one embodiment, for example, there may be a member of the day section that is placed in the area 1721. Ads may be set by dynamically populating them from an available pool of ads, for example in some kind of round-robin technique.

The rotation determines how frequently the content shifts. The system can determine other characteristics. It can determine how many ads are displayed, sizes of the ads, and other parameters.

The scheduled items can also define start time and end time. The start time 1730 indicates when the theme is first applied. The end time 1732 defines when the theme ends. Once the item is saved, it is automatically placed in the scheduler.

Figure 18:
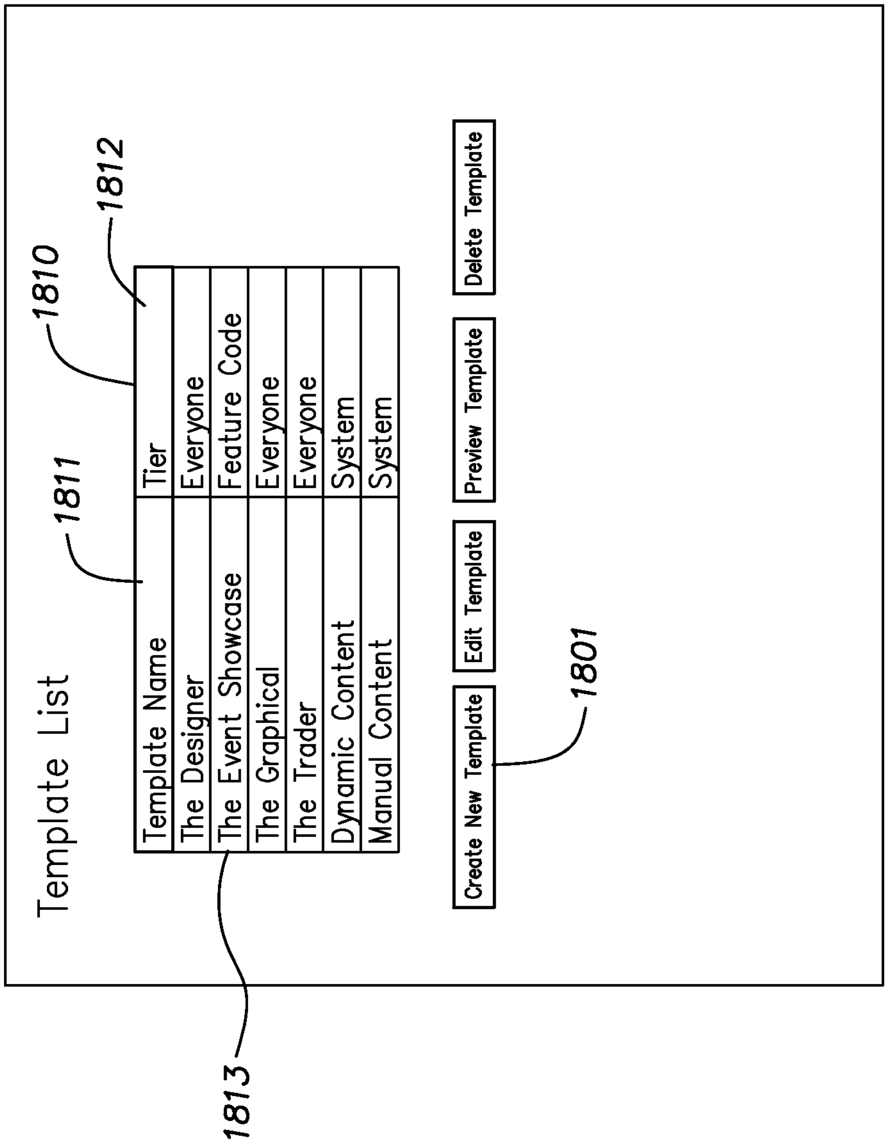
FIG. 18 illustrates a template list.

Templates, once created, can be selected from the template list shown in FIG. 18. For example, this list allows creating a new template by using the add button 1801, editing, previewing, or deleting templates. The populated list 1810 may include a scrollable list for example that allows different templates to be viewed. Each template has a name, and a tier 1812. For example, the different tiers are shown in the list of FIG. 18.

The feature code tier refers to templates that are unlocked through feature codes. These templates can only be used by a user who has entered a specified feature code. In this embodiment, the user obtains a feature code either from buying a product, or in some other way. Once the feature code is entered, it unlocks a specified template, such as the template shown as the event showcase 1813. Another embodiment allows these templates to be directly related to the amount of activity a user does on the site. Users who have played more and/or have more pets, will have more options for customizing their site. In addition to the templates being customizable, the elements within the widgets themselves can also be restricted either by feature code, or activity on the site.

A tier called "everyone" refers to templates that are available to all users. The tier entitled "system" refers to tiers that are only available to administrative users.

Figure 19:
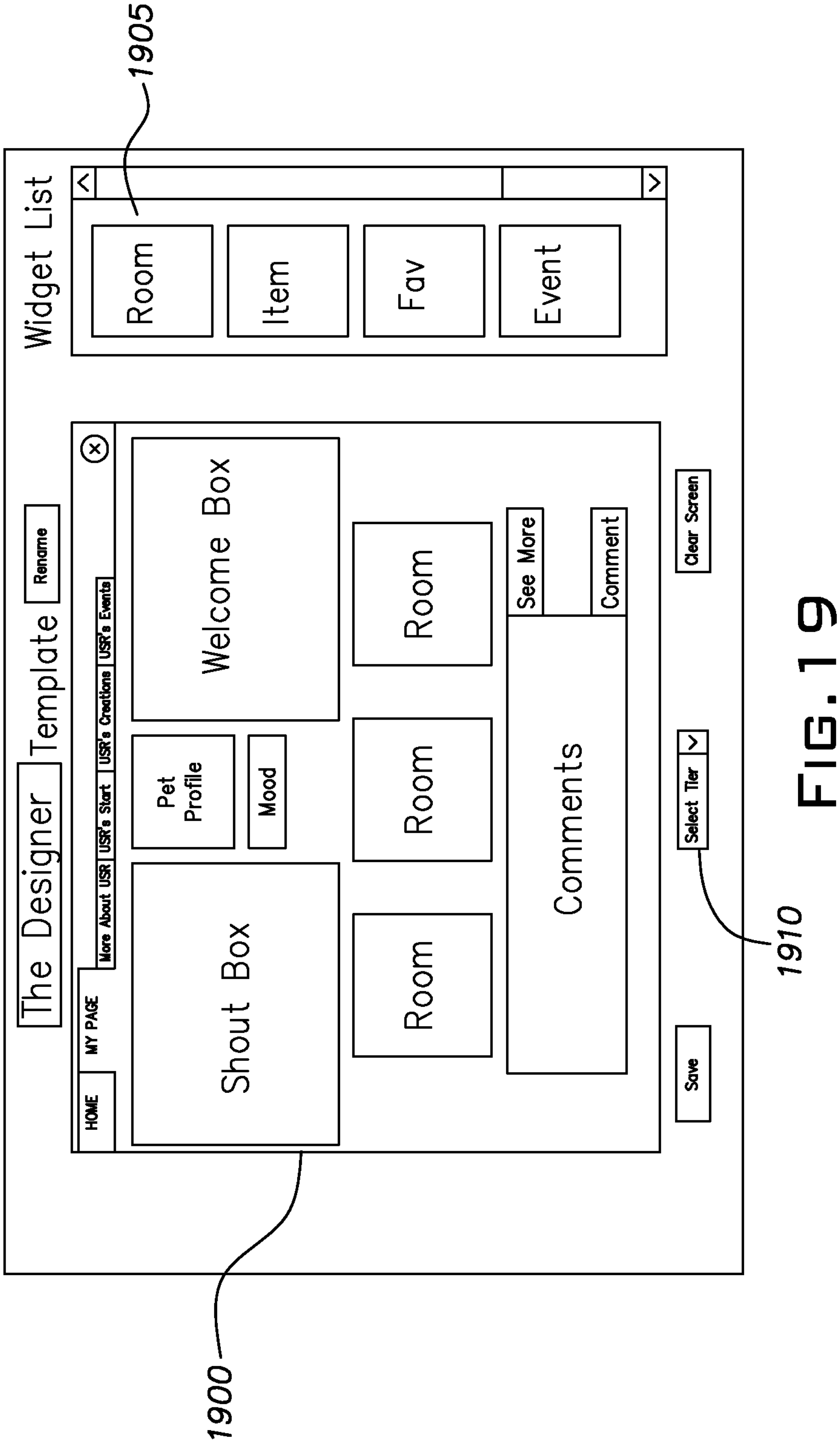
FIG. 19 illustrates a template editor.

A template can be created using the 'create a template' button 1801 that brings out the designer templates shown in FIG. 19. This allows building templates in a flash interface using a palette of widgets and drag-and-drop portions that can be dropped onto the preview box 1900. A widget list 1905 may be a scrollable list that has a number of different widgets such as room widgets, and the like. The designer templates may be used only by system administrators or by users. A tier for the template 1910 may also be set.

Figure 20:
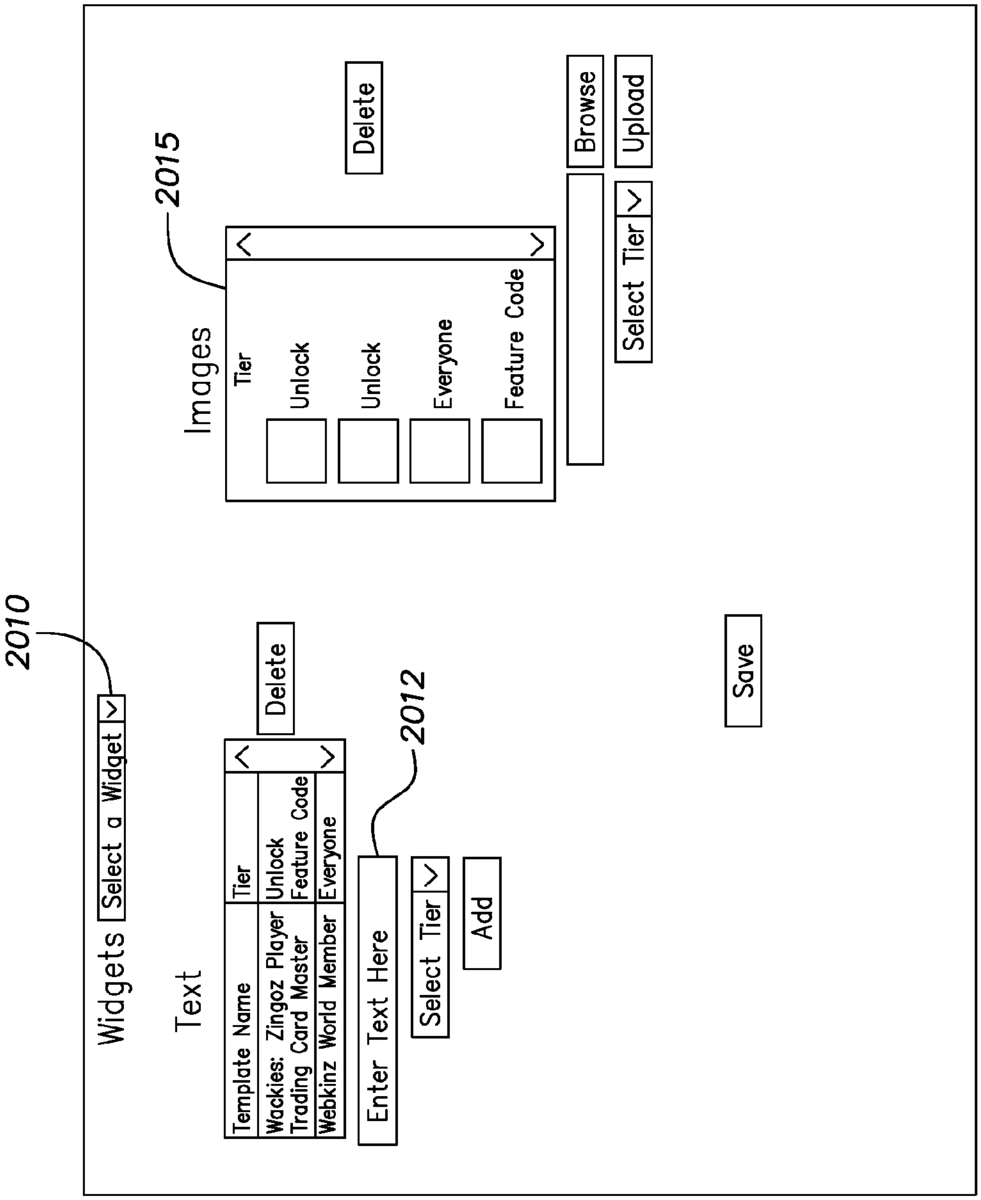
FIGS. 20 and 21 illustrate a widget editor.

A number of different widget editors may be used in a similar way. A type 1 widget editor is shown in FIG. 20. The type 1 widget editor allows editing/adding all of the widgets that can include textual elements as well as graphic elements, but does not include content categories. For example, the widget can be selected from the drop-down menu 2010. The widget can be, for example, a tagline widget, a status widget, shout box, welcome box, mood, banner, events, high score, or badges widget. Content can then be edited to the selected widget. For example, textual elements are accessed by one set of navigation arrows; graphic elements are accessed by another set of navigation arrows. If the text element is selected, a text box 2012 is also provided. This also allows setting the different texts that can be displayed with the widget. As in the above example, tiers for the widgets can also be set.

The tiers include the everyone tier; the feature code tier; and others as described above. In addition, however, unlock tiers may also be provided. An unlock tier does not allow a user to use the tier until they have reached a certain criteria, for example until they hit the value 600 on the Wacky Zingoz game.

Figure 21:
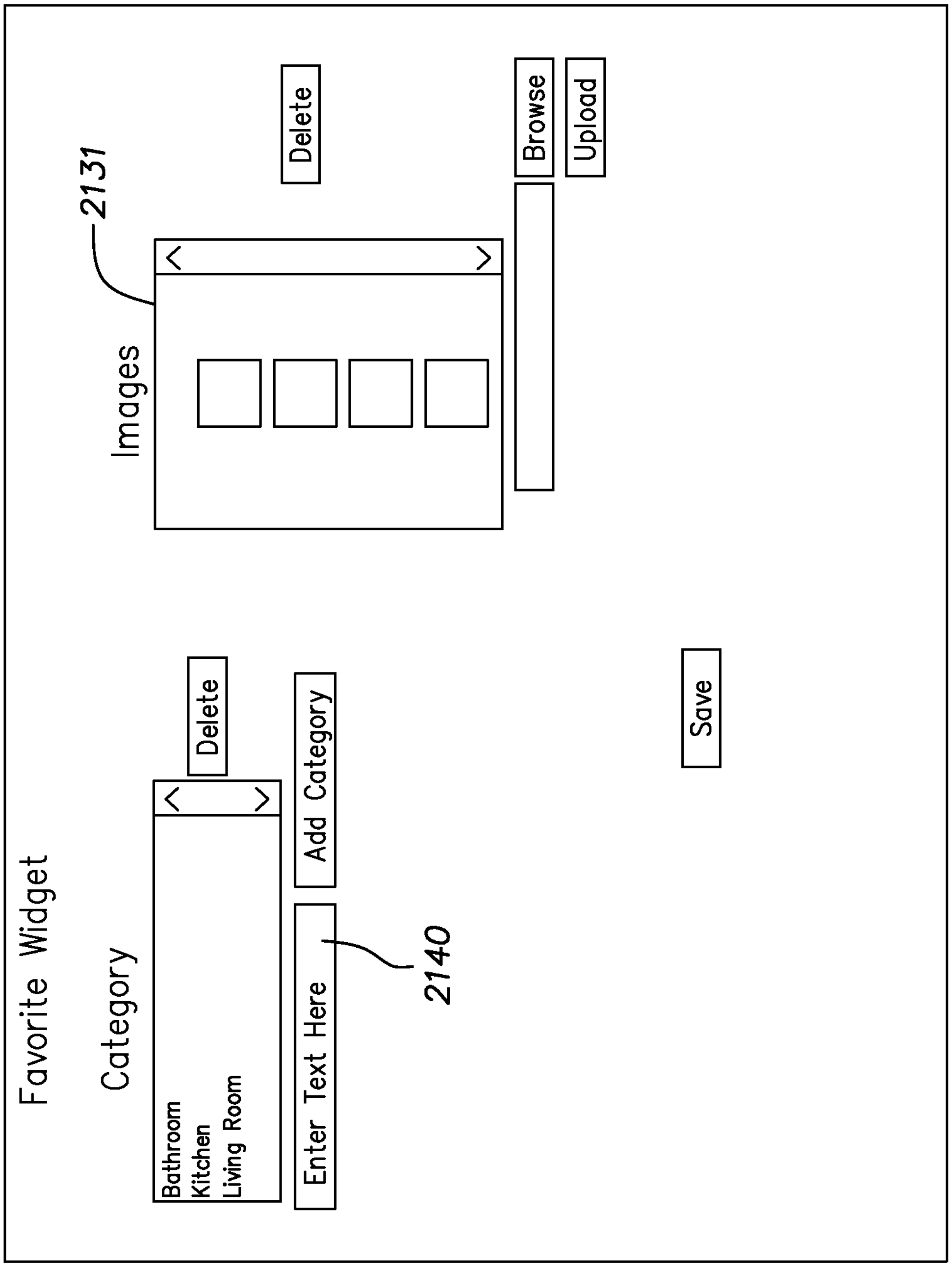

FIG. 2 illustrates a type 2 widget editor. This involves all of the widgets that have a category specification, followed by content that is specific to that category. For example, the categories shown in FIG. 21 include the bathroom, kitchen, and living room categories. Images can also be added and removed. When an image is added, a category 2121 is associated with that image. Categories must be selected so that they are classified correctly. For example, job-related images might have their category set as "favorite jobs" so that those images only appear when the user selects "the favorite jobs category". The rooms category may be associated with a room.

A comment editor allows adding a comment into, for example, the text box as 2140. For example, this may allow adding a comment that is associated with a category. For the rooms category, comments may include comments such as "you have amazing rooms" or "you're a five-star designer" or "I love your rooms".

Figure 22:
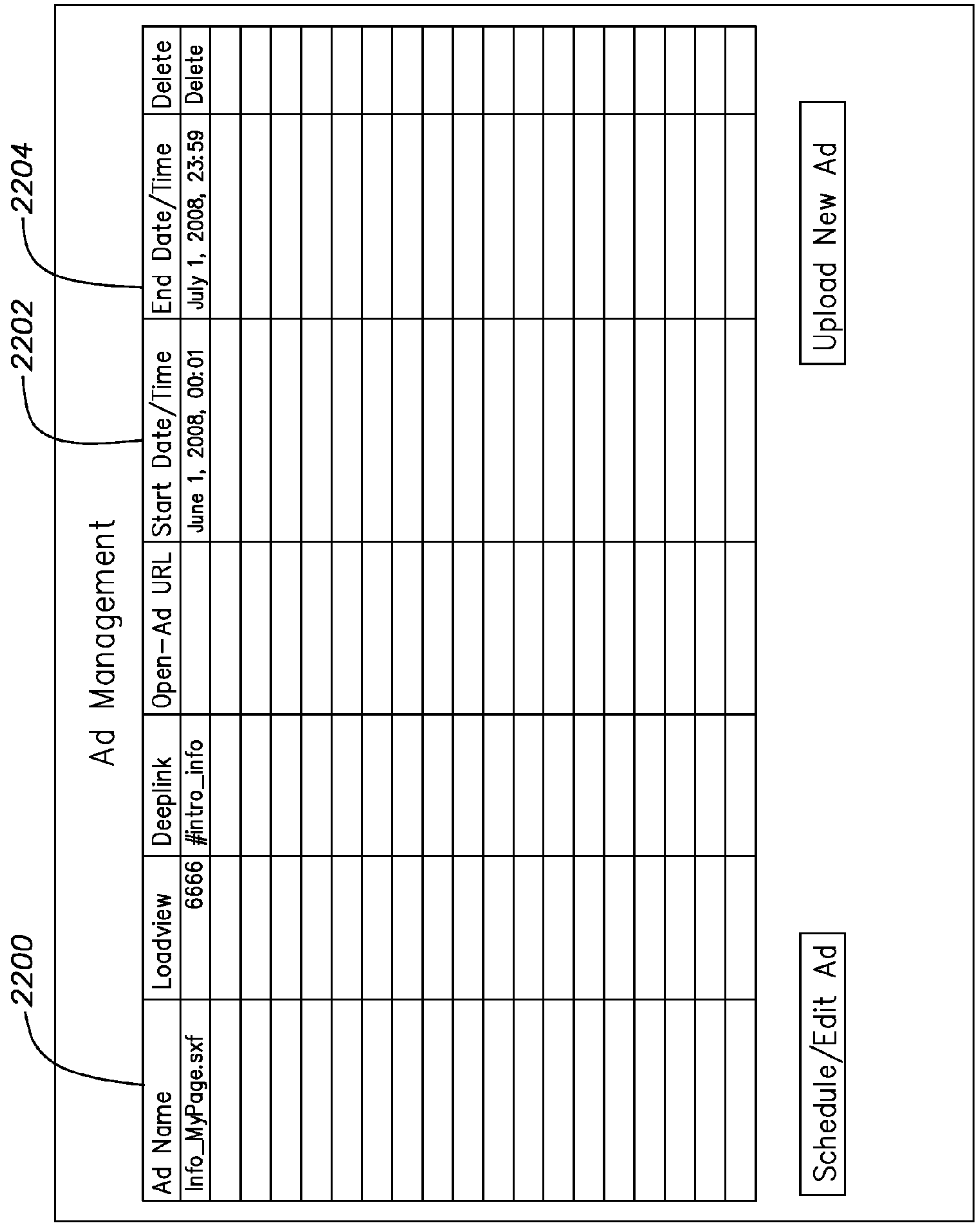
FIG. 22 illustrates ad management.

The ad management section shown in FIG. 22 allows administration of the ads that will be appearing in the push section of the site. This includes an ad name 2200, as well as link and view information. It also includes start and end times 2202 and 2204. The start time sets the exact time that the ad is put into circulation. The end time sets the time that the ad is removed from circulation.

In an analogous way to the above, the themes can be uploaded, commented, and they are accessibility and degree of access can be set.

The general structure and techniques, and more specific embodiments which can be used to effect different ways of carrying out the more general goals are described herein.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, while the above describes certain kinds of widgets, it should be understood that other widgets can similarly be used. Moreover, this can be used on other styles and kinds of websites.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers which are used to host the website and/or to access the website may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method, comprising the steps of:

on a computer, producing a user interface operable by a user, which allows selection of a first template from a plurality of templates, each one of said templates for arrangement of a personalizable portion of a website, where said templates define characteristics of a layout of said website and also define which rooms associated with said user will be displayed, and which other user rooms, associated with other users of the site other than the user, will be displayed;

receiving entry of a code from the user on the website;

verifying the code on the website;

responsive to said verifying the code, allowing the user to use an additional template other than said plurality of templates as said first template, for said arrangement of said personalizable portion of the website, where said additional template is not usable for said arrangement of said personalizable portion of the website prior to entry of the code and where said additional template defines all of: said rooms associated with said user which will be shown to others, different images which can be used on the website to be shown to others, and dynamic content on the website which changes periodically; and automatically using said first template to arrange an arrangement of the user's website.

2. A method as in claim 1, wherein said automatically using is automatically carried out between a preset start time and a preset end time to automatically use said first template between said start time and said end time, and not to use said first template before said start time or after said end time.

3. A method as in claim 2, further comprising the step of allowing modifying at least one of the preset start time and preset end time.

4. A method as in claim 1, further comprising the steps of:

determining if a user has reached a certain score in a first activity on the website, where the first activity is one that receives scores for participation, and allowing the user to use a second additional template for arrangement of their website only after the user has reached said certain score, where said second additional template defines different characteristics of the layout of said website and also defines different ones of a plurality of other users rooms that will be displayed different than those in said plurality of templates.

5. A method as in claim 1, wherein said website allows collection of virtual items and includes a social networking part that allows display of said virtual items, and wherein said template sets a format of said display.

6. A method as in claim 5, wherein said first template sets criteria for items of multiple users to be displayed.

7. A method as in claim 6, wherein said criteria includes ratings, and said website displays only items to be displayed if their ratings exceed a specified threshold.

8. A method as in claim 1, wherein at least a part of said templates displays dynamic content which changes at specified intervals and said templates also define how often dynamic content will be refreshed, with said first template defining dynamic content being refreshed at a first interval and a second template defining dynamic content being refreshed at a second interval different than said first interval.

9. A method, comprising the steps of:

allowing selection of a first template from a plurality of templates, said templates for arrangement of a personalizable portion of a website, where each said template defines characteristics of a layout of said website and also defines which of a plurality of other user rooms will be displayed;

allowing selection of a time associated with said first template; and automatically using said first template to define the characteristics of the website only for a first limited time that is based on said time, and after said first limited time, arranging said personalizable portion of a website based on a different template, other than said first template, and allowing for a setting of a new limited time after expiration of said first limited time;

receiving entry of a code from a user on the website;

verifying the code on the website; and responsive to said verifying the code, allowing the user to use an additional template for said arrangement of said personalizable portion of the website, where said additional template is not usable for said arrangement of said personalizable portion of the website prior to the user entering the code; and wherein said template sets a characteristic of dynamic content that will be displayed including setting how often dynamic content will be changed.

10. A method as in claim 9, further comprising the step of allowing modifying said limited time.

11. A method as in claim 9, wherein said limited time includes both a preset start time and a preset end time.

12. A method as in claim 9, wherein said website allows collection of virtual items and includes a social networking part that allows display of said virtual items, and wherein said template sets a format of said display.

13. A method as in claim 12, wherein said template sets criteria for items of multiple users to be displayed.

14. A method as in claim 13, wherein said criteria includes ratings, and displays only items to be displayed if their ratings exceed a specified threshold.

15. A method as in claim 14, wherein at least a part of said template displays dynamic content which changes at specified intervals and further comprising enabling controlling said intervals.

16. A method, comprising the steps of:

allowing selection of a template from a plurality of templates, said templates for arrangement of a personalizable portion of a website, where each said template defines characteristics of a layout of said website, defines which of a plurality of other user rooms will be displayed, defines display of dynamic content which changes at specified intervals, and also defines said intervals;

allowing participation in activities on said website;

assigning scores for said participation in said activities, said scores based on said participation in said activities;

determining if a user has reached a certain score in a first activity on the website; and responsive to said determining that said user has reached said certain score in said first activity, allowing the user to use an additional template for arrangement of said personalizable portion of a website, where said additional template is not usable for said arrangement of said personalizable portion of the website prior to the user reaching said certain score, and where said additional template defines different dynamic content than content in said plurality of templates and defines a different rotation interval that sets how often said dynamic content is updated.

17. A method as in claim 16, further comprising the step of automatically using a selected template to arrange an arrangement of the user's website.

18. A method as in claim 17, wherein said automatically using is automatically carried out between a preset start time and a preset end time.

19. A method as in claim 18, further comprising the step of allowing modifying at least one of the preset start time and preset end time.

20. A method as in claim 16, wherein said website allows collection of virtual items and includes a social networking part that allows display of said virtual items, and wherein said template sets a format of said display.

21. A method as in claim 20, wherein said template sets criteria for items of multiple users to be displayed.

22. A method as in claim 21, wherein said criteria includes ratings, and said website displays only items to be displayed if their ratings exceed a specified threshold.

* * * * *

UNITED STATES PATENT AND TRADEMARK OFFICE

CERTIFICATE OF CORRECTION

PATENT NO. : 8,627,209 B2
APPLICATION NO. : 12/136469
DATED : January 7, 2014
INVENTOR(S) : Howard Ganz et al.

It is certified that error appears in the above-identified patent and that said Letters Patent is hereby corrected as shown below:

In the Claims:

In claim 9, column 13, line 19, please remove "and"

Signed and Sealed this
Twenty-ninth Day of April, 2014

Michelle K. Lee

Michelle K. Lee
*Deputy Director of the United States Patent and Trademark Office*